United States Patent Office 3,169,828
Patented Feb. 16, 1965

3,169,828
PROCESS OF PRODUCING BORON NITRIDE
Akinori Muta, House 4–N211, 30 Hiro-machi,
Nakano-ku, Tokyo, Japan
No Drawing. Filed Feb. 19, 1964, Ser. No. 345,858
1 Claim. (Cl. 23—191)

This invention relates to the production of boron nitride, and more particularly it relates to a new and improved process for the production of boron nitride having high purity.

This application is a continuation-in-part of the application for U.S. patent Serial No. 5,642, filed on February 1, 1960.

It is an object of this invention to provide a new and improved process for the production of high-purity boron nitride with high rate of yield, yet at low overall cost.

It is another object of this invention to provide such a process without entailing the various disadvantages of the conventional processes used or proposed heretofore for the production of boron nitride.

Other objects and several advantages of the invention will appear hereinafter.

The objects of this invention may be achieved, in general, by heating about 20 parts by weight of borax and between about 5 to about 20 parts by weight of ammonium chloride in a stream of ammonia gas at a temperature between about 850° C. to about 2,000° C.

Recently, the demand for boron nitride, as an industrial material, has been increasing at a highly accelerated rate for such products as solid lubricants, electric insulators, refractory materials, and cermets. Yet, the conventional processes for the production of these ever increasingly important materials have entailed several disadvantages.

As processes for the production of boron nitride, the principal, conventional processes which have been generally used are as follows:

(I) The process wherein borax and ammonium chloride are heated.
(II) The process wherein boric oxide is heated in ammonia gas.
(III) The process wherein boron chloride and ammonia are processed in the gaseous state.

These processes have the following disadvantages. In the reaction of the process (I), the yield is extremely low; therefore, this process is not suitable for industrial production.

In the reaction of the process (II), it is necessary to add a quantity of tricalcium phosphate which is twice that of the boric oxide because the said boric oxide is previously made into a porous mass.

In the reaction of the process (III), boron trichloride is used as a raw material, and a considerably large number of process steps are required for the production of this substance, which cannot be said to be suitable from the point of view of price.

The above-mentioned disadvantages have been eliminated in the process of this invention, the details and advantages of which will be more clearly apparent by reference to the following detailed description, including an illustrative example.

In the process of this invention, borax and ammonium chloride are heated in a stream of ammonia gas at temperatures between about 850° C. to about 2,000° C. to produce boron nitride. Said process has been obtained by combining improved processes developed from the above processes (I) and (II).

The present process has been developed to eliminate the disadvantages of the conventional processes as described previously and may be justifiably claimed to be a new process.

In the process of this invention, the additive agents required in the reaction of the process (II), above, for providing porosity are unnecessary. Furthermore, a yield which may be high as 95 percent of the theoretical value can be obtained by the present process, and this yield is considerably higher than that of the process (II), which is approximately 75 percent of the theoretical value. Moreover, the production process steps of the present process are simple, and the cost of raw materials is also substantially lower than those of conventional process. Accordingly, a price of finished product which is $1/10$ of those of the products produced by the conventional processes is attainable. Thus, by the process of the present invention, low-price boron nitride can be produced easily and rapidly.

The reason why additive agents are unnecessary in the process of this invention is that a porous mass is formed in the reaction of borax and ammonium chloride. The reason why the yield is extremely close to the theoretical value is that, although lack of nitrogen to be reacted with the said porous mass may be caused by the sublimation of the ammonium chloride, the replenishment of nitrogen, due to the medium of ammonia gas, is effected sufficiently. Further, the reason for the specification between about 850° C. to about 2,000° C. for the heating temperature is because reaction does not take place at temperatures below 800° C., and reaction is restricted at temperatures about 2,000° C. because of the suitable ceramic reaction vessel can not be obtained now.

The following example describes concretely the process of this invention.

*Example 1*

20 grams of borax and 5.6 grams of ammonium chloride were placed in a graphite crucible, which was then placed in a quartz tube, through which ammonia gas was passed while said tube and contents were heated respectively for 2, 1 and 0.5 hour at 850, 1100 and 1400° C., in an electric furnace. When the heating temperature was higher than 1,500° C., graphite crucible lined with boron nitride was used and fused alumina tube was used instead of quartz tube. And said alumina tube is rested in the graphite crucible and then heated by a high-frequency current. The products produced by the above process was placed in warm water and boiled to dissolve out sodium chloride and residual impurities, whereupon 4.5 grams of crystalline powder were obtained. The said crystals were examined by the X-ray powder method and determined clearly to be crystals of boron nitride. The results obtained from above mentioned experiments are as follows:

| Reaction temperature (° C.) | Reaction time (hr.) | Yield (g.) | Theoretical yield (percent) |
|---|---|---|---|
| 850 | 2 | 4.5 | 86.4 |
| 1,100 | 1 | 4.6 | 88.3 |
| 1,400 | 0.5 | 4.8 | 92.1 |
| 1,800 | 0.3 | 5.9 | 94.5 |

*Example 2*

20 grams of borax and 0.5 to 20 grams of ammonium chloride were placed in a graphite crucible, which was then placed in a quartz tube, through which ammonia gas was passed while said tube and contents were heated for 2 hours at 1,100° C. in an electric furnace. The products produced by the above process was placed in warm water and boiled to dissolve out sodium chloride and residual impurities. The results obtained from above mentioned experiments are as follows:

| Borax $Na_2B_4O_7.10H_2O$ | Ammonium Chloride $NH_4Cl$ | Yield (g.) | Theoretical Yield (g.) |
|---|---|---|---|
| 20 | 1 | 6.2 | 60.2 |
| 20 | 2 | 6.4 | 61.5 |
| 20 | 4 | 7.6 | 74.1 |
| 20 | 6 | 9.4 | 90.3 |
| 20 | 8 | 9.2 | 88.7 |
| 20 | 10 | 9.4 | 90.3 |
| 20 | 12 | 9.0 | 86.3 |
| 20 | 16 | 8.6 | 83.9 |
| 20 | 20 | 4.1 | 79.0 |

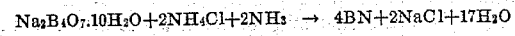

$Na_2B_4O_7.10H_2O + 2NH_4Cl + 2NH_3 \rightarrow 4BN + 2NaCl + 17H_2O$

| $Na_2B_4O_7.10H_2O$ | $NH_4Cl$ | Yield (g.) | Theoretical Yield (percent) |
|---|---|---|---|
| 10 | ------ | 1.6 | 31.5 |
| 10 | 0.5 | 3.1 | 60.2 |
| 10 | 1 | 3.2 | 61.5 |
| 10 | 2 | 3.8 | 74.1 |
| 10 | 3 | 4.7 | 90.3 |
| 10 | 4 | 4.6 | 88.7 |
| 10 | 5 | 4.7 | 90.3 |
| 10 | 6 | 4.5 | 86.3 |
| 10 | 8 | 4.3 | 83.9 |
| 10 | 10 | 4.1 | 79.0 |

Conditions: Reaction temperature _____ 1100° C.
Reaction time _____ Two hours.
Flow amount of $NH_3$ _____ 1.2 l./min.
Reaction amount (borax) _____ 20 g.

Since it is obvious that many changes and modifications can be made in the above described details without departing from the nature and spirit of the invention, it is to be understood that the invention is not to be limited to the details described herein except as set forth in the appended claim.

What I claim is:

The process of producing boron nitride, comprising the steps of heating about 20 parts by weight of borax and between about 5 to 20 parts by weight of ammonium chloride in a reaction zone while passing ammonia gas through said zone at a temperature between about 850° C. to about 2,000° C., for about two hours, placing the reaction product in warm water and boiling to dissolve out the sodium chloride and residual impurities.

References Cited by the Examiner

UNITED STATES PATENTS 2,974,013  3/61  Litz _____ 23—191

OTHER REFERENCES

Mellor: "A Comprehensive Treatise on Inorganic and Theoretical Chemistry," Longmans, Green and Co., New York, 1928, vol. 8, page 109.

Berichte der Deutschen Chemischen Gesellschaft, Jahrig 35, Band 1 (1902), pages 535–539.

Lange: Handbook of Chemistry, fifth ed., 1944, Handbook Publishers Inc., Sandusky, Ohio, page 858.

Gmelin: "Handbuch der Anorganischen Chemie," 8th ed., 1926 (main volume), System No. 13, "Bor," page 104–107.

MAURICE A. BRINDISI, *Primary Examiner.*